US012638940B2

(12) United States Patent
Lin

(10) Patent No.: US 12,638,940 B2
(45) Date of Patent: May 26, 2026

(54) DRIVING CIRCUIT AND OPERATING METHOD THEREOF AND CONTROLLING CIRCUIT

(71) Applicant: Novatek Microelectronics Corp., Hsinchu (TW)

(72) Inventor: Wu Wei Lin, Taoyuan (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 19/196,698

(22) Filed: May 1, 2025

(65) Prior Publication Data

US 2026/0126877 A1 May 7, 2026

(30) Foreign Application Priority Data

Nov. 4, 2024 (TW) ................................. 113142072

(51) Int. Cl.
| | |
|---|---|
| *G06F 3/041* | (2006.01) |
| *G06F 3/0338* | (2013.01) |
| *G06F 3/038* | (2013.01) |
| *G09G 3/36* | (2006.01) |

(52) U.S. Cl.
CPC ........ *G06F 3/04182* (2019.05); *G06F 3/0338* (2013.01); *G06F 3/038* (2013.01); *G06F 3/0412* (2013.01); *G09G 3/3648* (2013.01); *G06F 2203/0381* (2013.01); *G09G 2300/089* (2013.01); *G09G 2320/0214* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 11,209,919 B1 * | 12/2021 | Lin | ........................... G06F 3/02 |
| 11,625,131 B2 | 4/2023 | Williams et al. | |
| 11,972,083 B2 | 4/2024 | Williams et al. | |

(Continued)

FOREIGN PATENT DOCUMENTS

| | | |
|---|---|---|
| CN | 115129222 | 9/2022 |
| TW | 201003467 | 1/2010 |
| TW | 202236335 | 9/2022 |

OTHER PUBLICATIONS

"Office Action of Taiwan Counterpart Application", issued on Jun. 10, 2025, p. 1-p. 4.

*Primary Examiner* — Christopher J Kohlman
(74) *Attorney, Agent, or Firm* — JCIPRNET

(57) ABSTRACT

A driving circuit and an operating method thereof and a controlling circuit which are suitable for a knob apparatus are provided. The driving circuit includes multiple touch-sensing electrodes and a controlling circuit. The knob apparatus includes a knob and a touch panel. The knob is disposed on the touch panel. The touch-sensing electrodes and the controlling circuit are disposed in the touch panel. The touch-sensing electrodes are coupled to multiple pixel switches of the touch panel. The controlling circuit is coupled to the touch-sensing electrodes. During a touch period, the controlling circuit provides an offset voltage to a first touch-sensing electrode of the touch-sensing electrodes, such that a first pixel switch coupled to the first touch-sensing electrode maintains being turned off according to a touch-controlling signal and the offset voltage.

17 Claims, 7 Drawing Sheets

(56)                  References Cited

U.S. PATENT DOCUMENTS

| | | | |
|---|---|---|---|
| 11,983,338 B1 * | 5/2024 | Fong | G06F 3/0441 |
| 12,287,944 B2 | 4/2025 | Williams et al. | |
| 2022/0291778 A1 | 9/2022 | Williams et al. | |
| 2023/0010984 A1 | 1/2023 | Hayashi et al. | |
| 2023/0205383 A1 | 6/2023 | Williams et al. | |
| 2024/0241611 A1 | 7/2024 | Williams et al. | |
| 2024/0310936 A1 * | 9/2024 | Chang | G06F 3/04166 |
| 2025/0271461 A1 * | 8/2025 | Hirakawa | G01P 13/04 |

* cited by examiner

DRIVING CIRCUIT AND OPERATING METHOD THEREOF AND CONTROLLING CIRCUIT

CROSS-REFERENCE TO RELATED APPLICATION

This application claims the priority benefit of Taiwan application serial no. 113142072, filed on Nov. 4, 2024. The entirety of the above-mentioned patent application is hereby incorporated by reference herein and made a part of this specification.

BACKGROUND

Technical Field

The disclosure relates to an electronic circuit, and in particular relates to a driving circuit suitable for a knob apparatus and an operating method thereof.

Description of Related Art

Generally speaking, knobs are suitable for various electronic apparatuses. For example, the knob may be applied to the in-vehicle center information display (CID). Current in-vehicle center information displays allow drivers to touch knobs to implement corresponding functions, such as adjusting the temperature. However, during the touch operation, the pixel elements of the in-vehicle center information display may experience electrical leakage, resulting in visual anomalies (e.g., image retention) on the in-vehicle center information display.

SUMMARY

A driving circuit suitable for a knob apparatus is provided in the embodiments of the disclosure, in which the driving circuit is capable of preventing visual anomalies in the knob apparatus during a touch period.

The driving circuit in the embodiment of the disclosure includes a plurality of touch-sensing electrodes and a controlling circuit. The knob apparatus includes a knob and a touch panel. The knob is disposed on the touch panel. The plurality of touch-sensing electrodes are disposed in the touch panel. The plurality of touch-sensing electrodes are coupled to a plurality of pixel switches of the touch panel. The controlling circuit is disposed in the touch panel. The controlling circuit is coupled to the plurality of touch-sensing electrodes. The controlling circuit is configured to provide an offset voltage to a first touch-sensing electrode of the plurality of touch-sensing electrodes during a touch period, such that a first pixel switch coupled to the first touch-sensing electrode maintains being turned off according to a touch-controlling signal and the offset voltage.

An operating method of a driving circuit is further provided in an embodiment of the disclosure. The operating method is suitable for a knob apparatus. The operating method includes the following operation. The knob apparatus includes a knob and a touch panel. The knob is disposed on the touch panel. A controlling circuit provides an offset voltage to a first touch-sensing electrode of a plurality of touch-sensing electrodes during a touch period. The plurality of touch-sensing electrodes and the controlling circuit are disposed in the touch panel. The plurality of touch-sensing electrodes are coupled to a plurality of the pixel switches of the touch panel. The controlling circuit maintains a first pixel switch coupled to the first touch-sensing electrode being turned off according to a touch-controlling signal and the offset voltage during the touch period.

A controlling circuit is further provided in an embodiment of the disclosure. The controlling circuit is configured to control a voltage level of a touch-sensing electrode disposed in a touch panel at different moments. The touch-sensing electrode corresponds to a conductive electrode which is disposed in a bottom of a knob. When the knob is disposed in the touch panel, a user operates the touch panel through the knob. The controlling circuit includes a signal transmission circuit, an amplification circuit and a signal processing circuit. The signal transmission circuit has a plurality of first terminals and a second terminal. The first terminals of the signal transmission circuit are configured to receive offset voltage, a touch driving signal and a reference voltage. The second terminal of the signal transmission circuit is coupled to the touch-sensing electrode to provide one of the offset voltage, the touch driving signal and the reference voltage to the touch-sensing electrode during a touch period, or to receive a touch result signal. During the touch period, a pixel switch which is coupled to the touch-sensing electrode and is disposed in the touch panel maintains turned off according to a touch-controlling signal and the offset voltage. The amplification circuit is coupled to one of the first terminals of the signal transmission circuit to receive the touch result signal. The signal processing circuit is coupled to the amplification circuit. The signal processing circuit is configured to generate a touch output signal according to the touch result signal.

Based on the above, during the touch period, the driving circuit and the operating method and the controlling circuit of the embodiment of the disclosure provide the offset voltage to the touch-sensing electrode by the controlling circuit, such that the pixel switch coupled to such touch-sensing electrode is capable of being maintained at a turned off status based on such offset voltage, thereby preventing electrical leakage of the aforementioned pixel switch. In this way, the driving circuit is capable of preventing visual anomalies in the knob apparatus during the touch period.

In order to make the above-mentioned features and advantages of the disclosure comprehensible, embodiments accompanied with drawings are described in detail below.

DETAILED DESCRIPTION OF DISCLOSED EMBODIMENTS

A portion of the embodiments of the disclosure will be described in detail with reference to the accompanying drawings. Element symbol referenced in the following description will be regarded as the same or similar element when the same element symbol appears in different drawings. These examples are only a portion of the disclosure and do not disclose all possible embodiments of the disclosure. More precisely, these embodiments are only examples within the scope of the patent application of the disclosure.

Figure 1:
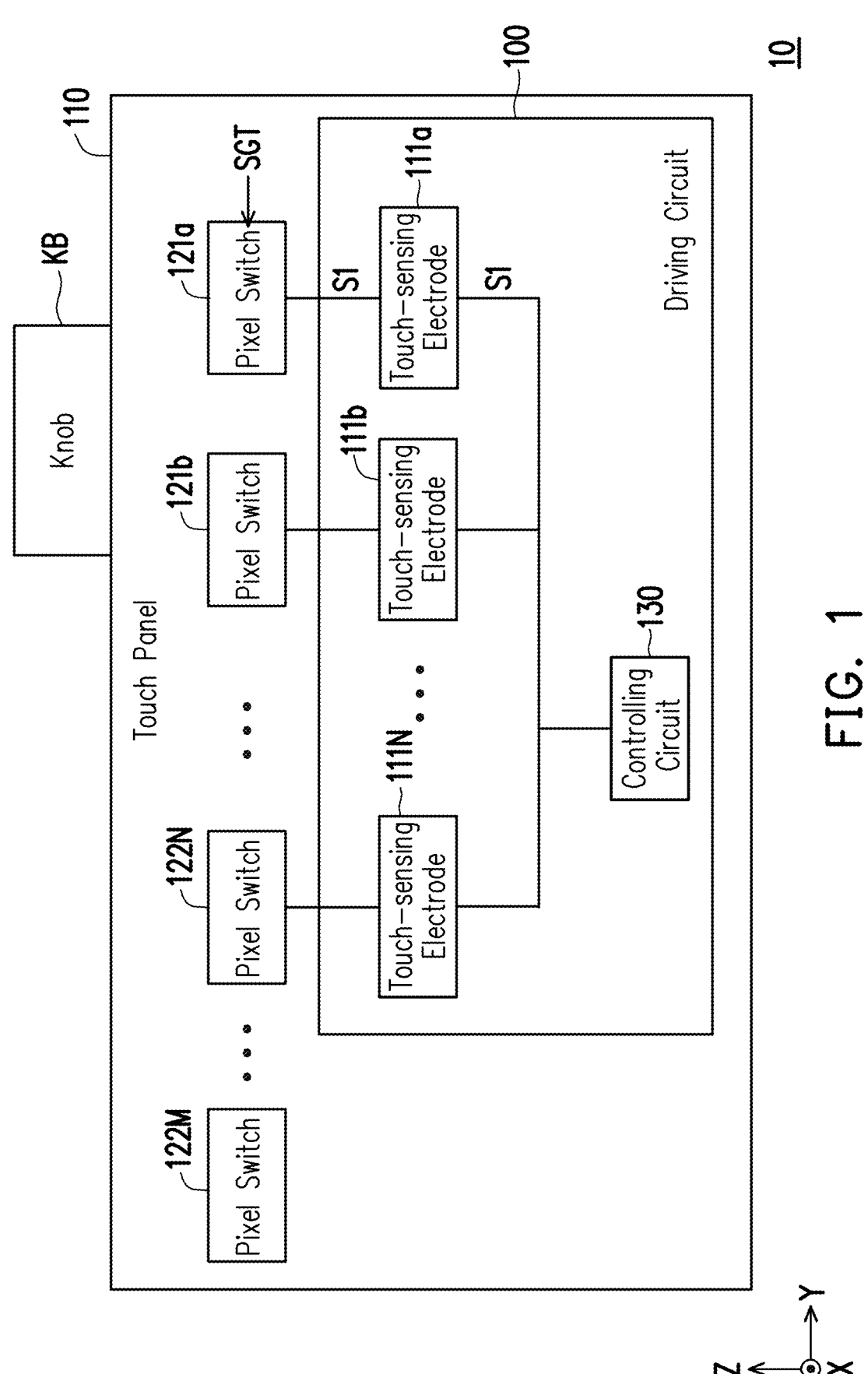
FIG. 1 is a circuit block diagram of a driving circuit according to an embodiment of the disclosure.

FIG. 1 is a circuit block diagram of a driving circuit according to an embodiment of the disclosure. Referring to FIG. 1, the driving circuit 100 is applied to a knob apparatus 10. The knob apparatus 10 includes a knob KB and a touch panel 110. The knob KB is disposed on the touch panel 110. The knob KB may be, for example, sensing element with a touch detection function. The touch panel 110 may be, for example, a display panel with the touch detection function or other touch detection panel. In this embodiment, the driving circuit 100 is configured to drive a touch circuit of the touch panel 110 to implement a touch function. The driving circuit 100 is further configured to drive a pixel circuit of the touch panel 110 to implement a display function.

In this specification, the term "knob apparatus" refers to a device used by the user for input, which actually comprises two independently operable components. The invention features the use of controlling circuit (e.g., the controlling circuit 130) to regulate the voltage of the touch-sensing electrode (e.g., the touch-sensing electrode 111a). This ensures that the pixel switch (e.g., the pixel switch 121a), which is coupled to the touch-sensing electrode, remains closed, effectively minimizing leakage current issues in the pixel switch during the touch period.

In this embodiment, the touch panel 110 further includes a plurality of pixel switches 121a to 122M, wherein M is in integer. These pixel switches 121a to 122M are respectively coupled to a plurality of pixel units of the pixel circuit. The pixel switches 121a to 122M and the pixel units may be, for example, arranged in an array. The pixel switches 121a to 122M are configured to turn on or turn off the pixel units, to implement the display function accordingly.

In this embodiment, the driving circuit 100 includes a plurality of touch-sensing electrodes 111a to 111N and a controlling circuit 130, wherein N is an integer. The controlling circuit 130 is coupled to the touch-sensing electrodes 111a to 111N. These touch-sensing electrodes 111a to 111N and the controlling circuit 130 are all disposed in the touch panel 110.

In this embodiment, the touch-sensing electrodes 111a to 111N are arranged corresponding to the knob KB, such that a projection of these touch-sensing electrodes 111a to 111N with respect to a Y direction is overlapped with the knob KB. In addition, the touch-sensing electrodes 111a to 111N are coupled to a part of the pixel switches 121a to 122M. For example, these touch-sensing electrodes 111a to 111N are coupled to multiple pixel switches 121a to 122N.

In the current application, one touch-sensing electrode (e.g., the touch-sensing electrode 111a) is coupled to one pixel switch (e.g., the pixel switch 121a). In another embodiment, one touch-sensing electrode (e.g., the touch-sensing electrode 111a shown in FIG. 1) is coupled to multiple pixel switches (including, the pixel switch 121a shown in FIG. 1). The bottom of the knob KB is equipped with multiple conductive electrodes. When the knob KB is positioned on the touch panel, these conductive electrodes create parasitic capacitors with the touch-sensing electrodes on the panel. The touch detection circuit or chip on the panel can identify touch events by monitoring changes in the capacitance of these parasitic capacitors. Furthermore, it can evaluate the user's interaction with the touch panel or the user interface on the panel based on detection results over a continuous time period.

Figure 2:
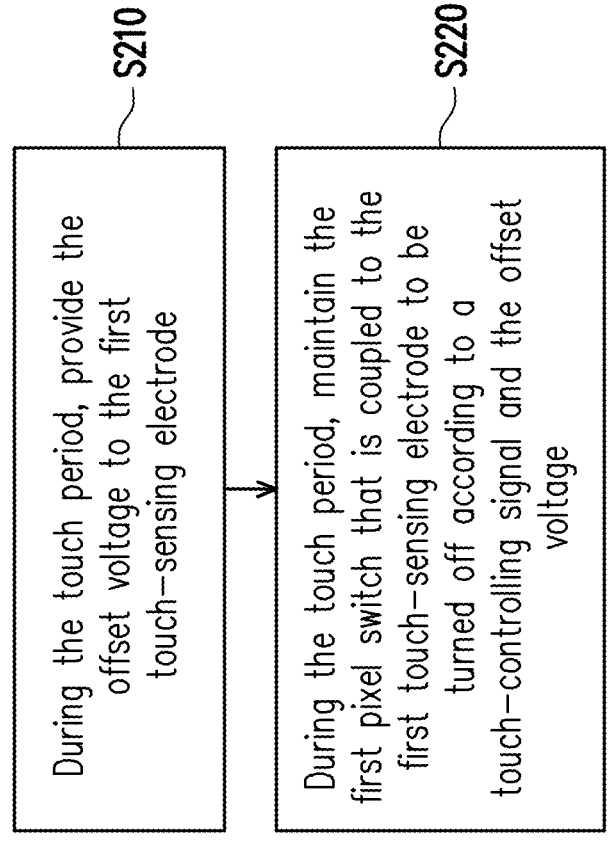
FIG. 2 is a flowchart of an operating method of a driving circuit according to an embodiment of the disclosure.

FIG. 2 is a flowchart of an operating method of a driving circuit according to an embodiment of the disclosure. Referring to FIG. 1 and FIG. 2, the driving circuit 100 performs steps S210 to S220. These steps S210 to S220 are applied during the touch period to execute the touch operation. The touch period is, for example, the operation period during which the knob apparatus is configured to implement the touch function, and is staggered with the display period configured to execute the display operation. The order of the steps S210 to S220 is only an example for illustration, and is not limited thereto.

In this embodiment, during the touch period, since at least one region of the knob KB is touched by a finger, the touch-sensing electrodes (e.g., the touch-sensing electrode 111a) corresponding to such region(s) is pulled to a reference ground voltage. In addition, during the touch period, a first pixel switch 121a coupled to a first touch-sensing electrode 111a is turned off. In order to avoid the first pixel switch 121a having the electrical leakage during the touch period, the driving circuit 100 performs steps S210 to S220.

In step S210, during the touch period, the controlling circuit 130 provides the offset voltage S1 to the first touch-sensing electrode 111a. The offset voltage S1 is, for example, a voltage signal other than 0 volts.

In this embodiment, the first touch-sensing electrode 111a may serve as a receiving electrode and a transmitting electrode. The first touch-sensing electrode 111a is configured to transmit controlling signals (including, the offset voltage S1). The controlling signals may be, for example, signals configured to drive the pixel switch 121a that is coupled to the first touch-sensing electrode 111a. The first touch-sensing electrode 111a is further configured to transmit sensing signals. The sensing signals may be, for example, signals configured to indicate touch data.

In step S220, during the touch period, the first pixel switch 121a that is coupled to the first touch-sensing electrode 111a maintains to be turned off according to a touch-controlling signal SGT and the offset voltage S1.

In this embodiment, the touch-controlling signal SGT is, for example, a controlling signal from the controlling circuit 130 to turn on or turn off the pixel switches 121a to 122M. In one embodiment, the touch-controlling signal SGT is, for example, from another driving circuit in the touch panel 110.

It is worth mentioning that during the touch period, by providing the offset voltage S1 to the first touch-sensing electrode 111a through the controlling circuit 130, such electrode 111a is no longer pulled to the reference ground voltage, and is pulled up (or pulled down) to the offset voltage S1 instead. Thereby, the first pixel switch 121a that is coupled to the first touch-sensing electrode 111a is capable of maintaining being turned off based on the offset voltage S1 according to the touch-controlling signal SGT. That is, the driving circuit 100 is capable of ensuring that the first pixel switch 121a corresponding to the electrode touched by the finger maintains at a turned off status during the touch period. In this way, the driving circuit 100 is capable of preventing the first pixel switch 121*a* from electricity leakage during the touch period, thereby preventing visual anomalies in the knob apparatus 10.

Figure 3:
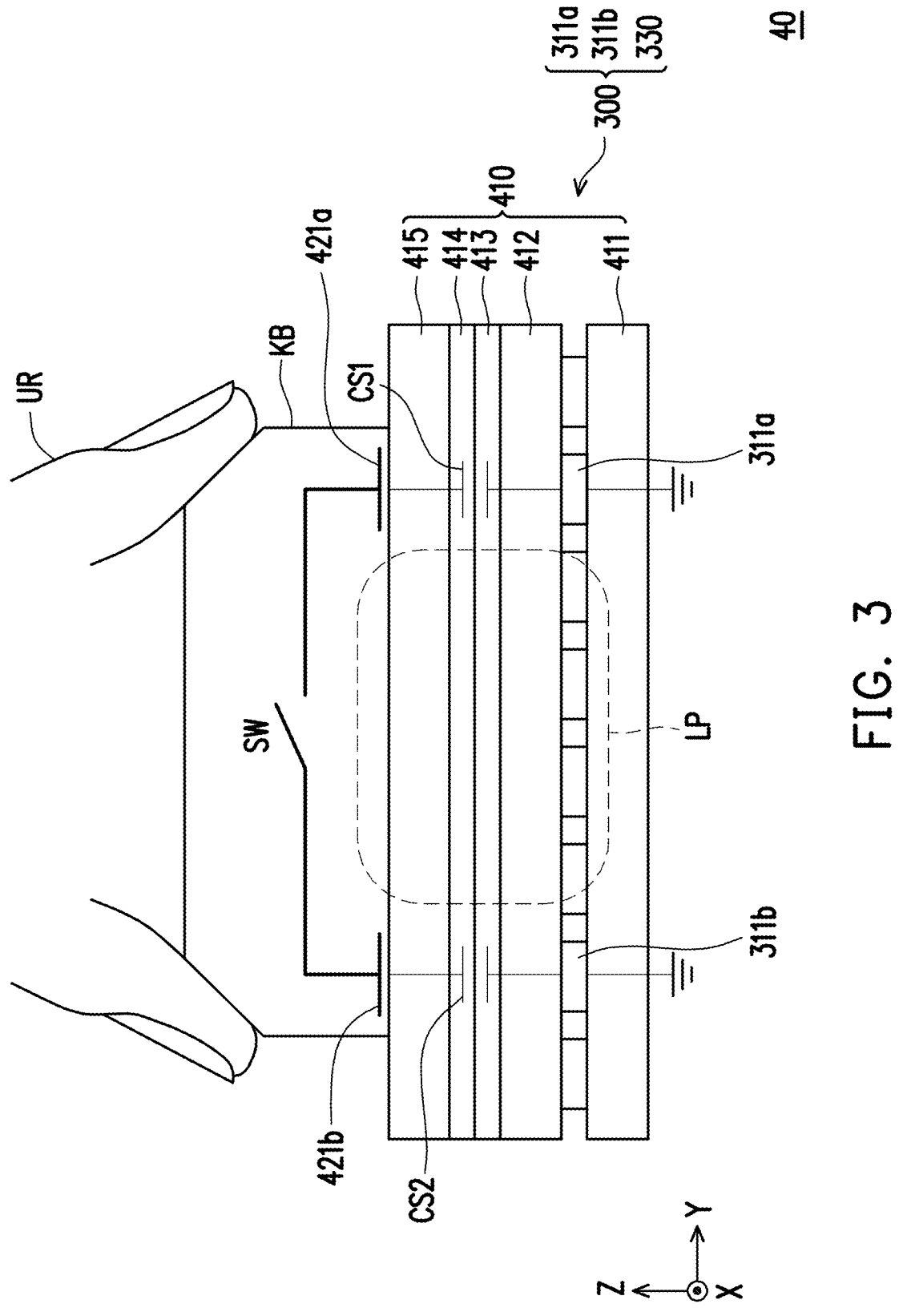
FIG. 3 is a circuit block diagram of a knob apparatus suitable for a driving circuit according to an embodiment of the disclosure.

FIG. 3 is a circuit block diagram of a knob apparatus suitable for a driving circuit according to an embodiment of the disclosure. Referring to FIG. 3, the driving circuit 300 is applied to the knob apparatus 40. The knob apparatus 40 includes a knob KB and a touch panel 410. The touch panel 410 includes multiple pixel switches (not shown in FIG. 3). The driving circuit 300 includes multiple touch-sensing electrodes (e.g., touch-sensing electrodes 311*a* and 311*b*), and a controlling circuit 330. The touch panel 410, the pixel switches, the touch-sensing electrodes 311*a* and 311*b*, and the controlling circuit 330 may be understood by analogy with the relevant descriptions of the knob apparatus 10.

In the embodiment of FIG. 3, the touch panel 410 includes a glass substrate 411, a pixel circuit (not shown), a liquid crystal layer (not shown), a color filter (CF) glass layer 412, a polarizer (POL) layer 413, an optical clear adhesive (OCA) layer 414, and a cover glass 415. In the Z direction, these material elements 411 to 415 are stacked in sequence.

In this embodiment, the touch-sensing electrodes 311*a* and 311*b* are disposed between the glass substrate 411 and the color filter glass layer 412 in the Z direction. The pixel switches and the controlling circuit 330 may be further disposed between the glass substrate 411 and the color filter glass layer 412.

In this embodiment, the knob KB is disposed (e.g., attached) on the touch panel 410. The knob KB includes multiple conductive electrodes (e.g., conductive electrodes 421*a* and 421*b*). On the X-Y plane, these conductive electrodes 421*a* and 421*b* and others not shown are disposed at different positions on the knob KB. The position, number, and geometry of the conductive electrodes may be determined according to the actual design of the knob KB.

In the example shown in FIG. 3, based on the user UR touching and twisting the knob KB, the knob KB may rotate on the X-Y plane. At this time, a switch SW of the knob KB is turned on, such that the corresponding inside wires electrically connects the conductive electrodes 421*a* and 421*b* together. During the touch period, the touch-sensing electrodes 311*a* and 311*b* detects whether these conductive electrodes 421*a* and 421*b* form a conductive loop LP with the touch-sensing electrodes 311*a* and 311*b*.

Based on the conductive loop LP, the touch-sensing electrode 311*a* and the conductive electrode 421*a* forms a sensing capacitor CS1, and the touch-sensing electrode 311*b* and the conductive electrode 421*b* forms a sensing capacitor CS1. Then, the touch-sensing electrode 311*a* generates a touch result signal according to sensing data corresponding to these sensing capacitors CS1 and CS2. The touch-sensing electrode 311*a* outputs the touch result signal to the controlling circuit 330, to obtain a position where the user UR currently touched.

Based on the rotation of the knob KB, the conductive electrodes 421*a* and 421*b* that are electrically connected cut off the coupling relationship with the touch-sensing electrodes 311*a* and 311*b*, and continuously form another conductive loop LP with other touch-sensing electrodes. Similarly, the controlling circuit 330 is capable of obtaining another position where the user UR touched by the touch-sensing electrodes. Based on the obtained occurrence sequence of multiple positions, the controlling circuit 330 is capable of obtaining a rotational direction of the knob KB.

Figure 4:
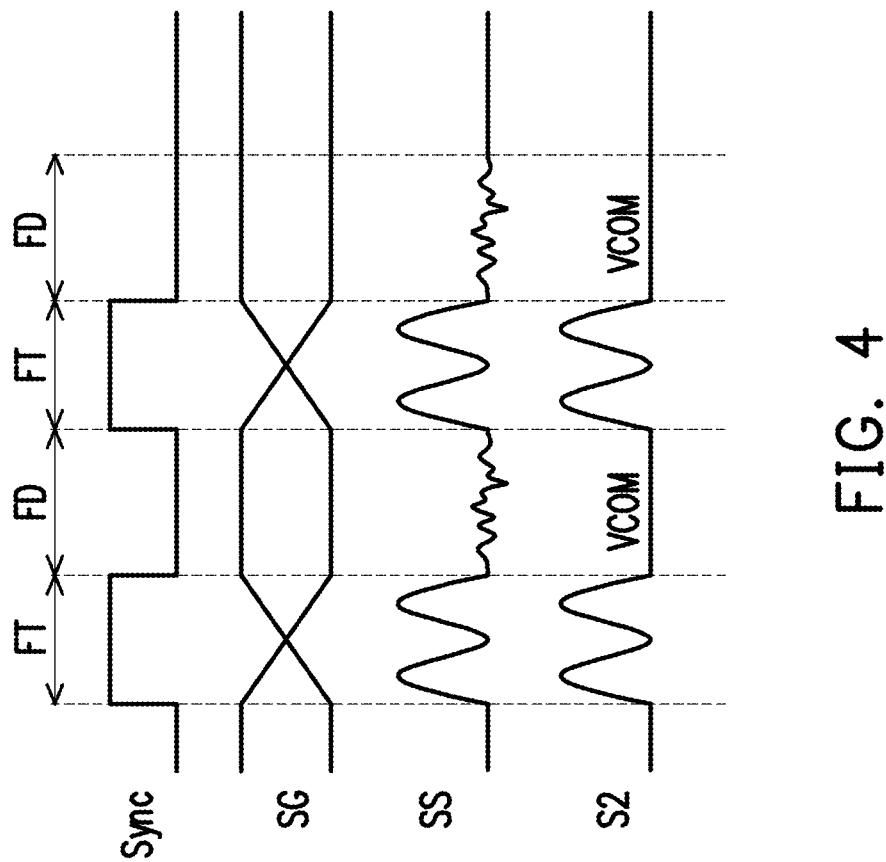
FIG. 4 is a schematic diagram of the operation of the knob apparatus according to the embodiment of FIG. 3 of the disclosure.

Referring concurrently to FIG. 4, FIG. 4 is a schematic diagram of the operation of the knob apparatus according to the embodiment of FIG. 3 of the disclosure. In FIG. 4, the horizontal axis represents the operation time of the knob apparatus 40 and the vertical axis represents the voltage value. In the embodiment of FIG. 4, the controlling circuit 330 alternately operates in multiple touch periods FT and multiple display periods FD according to the synchronization signal Sync to respectively execute touch operations and display operations.

In this embodiment, in each touch period FT, the controlling circuit 330 is configured to execute a touch operation. The controlling circuit 330 provides the touch driving signal S2 to the touch-sensing electrodes 311*a* and 311*b* to drive these touch-sensing electrodes 311*a* and 311*b* to execute sensing operations. The touch driving signal S2 is, for example, a time-varying signal.

In addition, in each touch period FT, the controlling circuit 330 sequentially provides multi-level gate controlling signals SG to multiple pixel units in the touch panel 410 through multiple gate lines, and sequentially provides multiple source controlling signals SS to these pixel units through multiple data lines to stop updating the display screen. In one embodiment, in each touch period FT, the controlling circuit 330 does not provide the source controlling signals SS to the pixel units. In another embodiment, in each touch period FT, the controlling circuit 330 does not provide the source controlling signals SS to the pixel units, and puts the pixel units in a high impedance (Hi-Z) state.

In this embodiment, in each display period FD, the controlling circuit 330 is configured to execute a display operation. The controlling circuit 330 provides the touch driving signal S2 to the touch-sensing electrodes 311*a* and 311*b*, such that these sensing electrodes 311*a* and 311*b* are in a floating state. The touch driving signal S2 is, for example, the reference voltage VCOM.

In addition, in each display period FD, the controlling circuit 330 sequentially provides multi-level gate controlling signals SG to multiple pixel units in the touch panel 410, and sequentially provides source controlling signals SS to these pixel units to update the display screen.

Figure 5A:
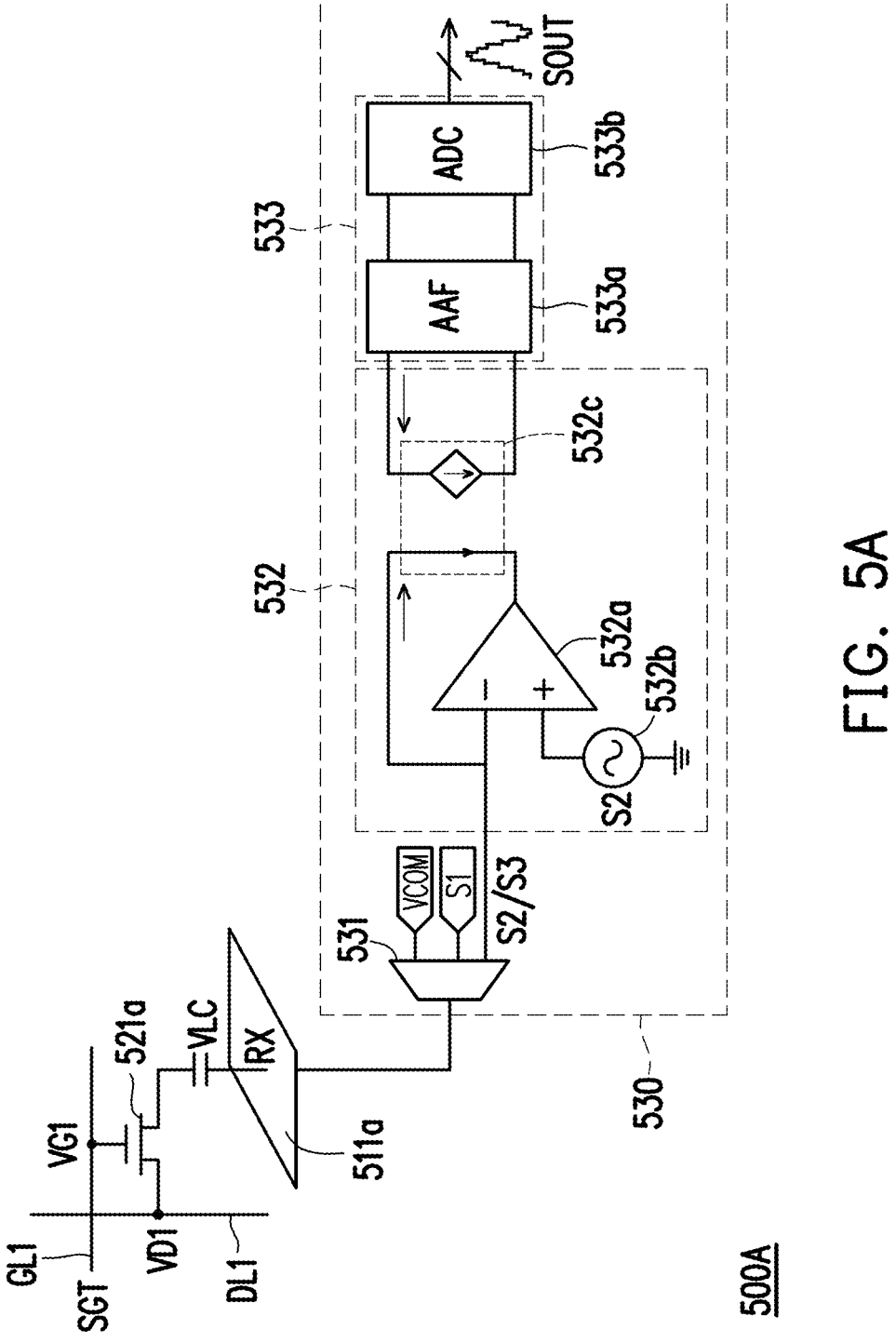
FIGS. 5A and 5B are circuit block diagrams of a driving circuit according to an embodiment of the disclosure.

FIG. 5A is a circuit block diagram of a driving circuit according to an embodiment of the disclosure. Referring to FIG. 5A, the driving circuit 500A includes a first touch-sensing electrode 511*a* and a controlling circuit 530. The first touch-sensing electrode 511*a* is coupled to a first pixel switch 521*a*. The first touch-sensing electrode 511*a*, the first pixel switch 521*a* and the controlling circuit 530 may be understood by analogy with the relevant descriptions of the driving circuit 100 or 300. In the current application, the driving circuit, including electrodes such as the driving circuit 500A, is provided solely for illustrative purposes. The driving circuit may consist solely of the controlling circuit. In the embodiment of FIG. 5A, the first pixel switch 521*a* is a transistor, and is implemented by, for example, an n-type metal-oxide-semiconductor field-effect transistor (NMOSFET). A control terminal (i.e., a gate terminal) of the transistor 521*a* is coupled to one gate line GL1 in the pixel circuit. A first terminal (i.e., a source/drain terminal) of the transistor 521*a* is coupled to the first touch-sensing electrode 511*a* through the liquid crystal layer. A second terminal (i.e., a source/drain terminal) of the transistor 521*a* is coupled to one data line DL1 in the pixel circuit.

In this embodiment, the controlling circuit 530 includes a signal transmission circuit 531, an amplification circuit 532, and a signal processing circuit 533. The signal transmission circuit 531 and the amplification circuit 532 may serve as an analog front end (AFE) circuit.

In detail, the multiple first terminals of the signal transmission circuit 531 may serve as input terminals to receive the reference voltage VCOM, the offset voltage S1, and the touch driving signal S2. A second terminal of the signal transmission circuit 531 is coupled to the first touch-sensing electrode 511a. The second terminals of the signal transmission circuit 531 may serve as an output terminal to provide one of the offset voltage S1, the touch driving signal S2, and the reference voltage VCOM to the first touch-sensing electrode 511a. The signal transmission circuit 531 is, for example, implemented as a multiplexer (MUX) and/or a demultiplexer (DEMUX).

In this embodiment, the second terminal of the signal transmission circuit 531 may also serve as an input terminal to receive signals (e.g., the touch result signal S3) from the first touch-sensing electrode 511a. One of the first terminals of the signal transmission circuit 531 may serve as an output terminal to transmit the aforementioned touch result signal S3 to the amplification circuit 532.

In this embodiment, one terminal of the amplification circuit 532 is coupled to one first terminal of the signal transmission circuit 531 to receive the touch result signal S3. Another terminal of the amplification circuit 532 is coupled to the signal processing circuit 533.

Specifically, the amplification circuit 532 includes an operational amplifier 532a, a current source 532b, and a dependent current source 532c. An input terminal of the operational amplifier 532a is coupled to the current source 532b to receive the touch driving signal S2. An inverting input terminal of the operational amplifier 532a is coupled to an output terminal of the operational amplifier 532a, one first terminal of the signal transmission circuit 531, and the dependent current source 532c. The dependent current source 532c is further coupled to an input terminal of the signal processing circuit 533.

In this embodiment, the output terminal of the signal processing circuit 533 is coupled to a processing circuit (not shown) in the driving circuit 300. The signal processing circuit 533 generates the touch output signal SOUT according to the touch result signal S3 to the processing circuit. Thereby, the processing circuit implement the touch function by the knob KB according to the touch output signal SOUT.

Specifically, the signal processing circuit 533 includes an anti-aliasing filter (AAF) 533a and an analog-to-digital converter (ADC) 533b. An input terminal of the AAF 533a is coupled to the dependent current source 532c. An output terminal of the AAF 533a is coupled to an input terminal of the ADC 533b. An output terminal of the ADC 533b is coupled to the processing circuit.

Figure 5B:
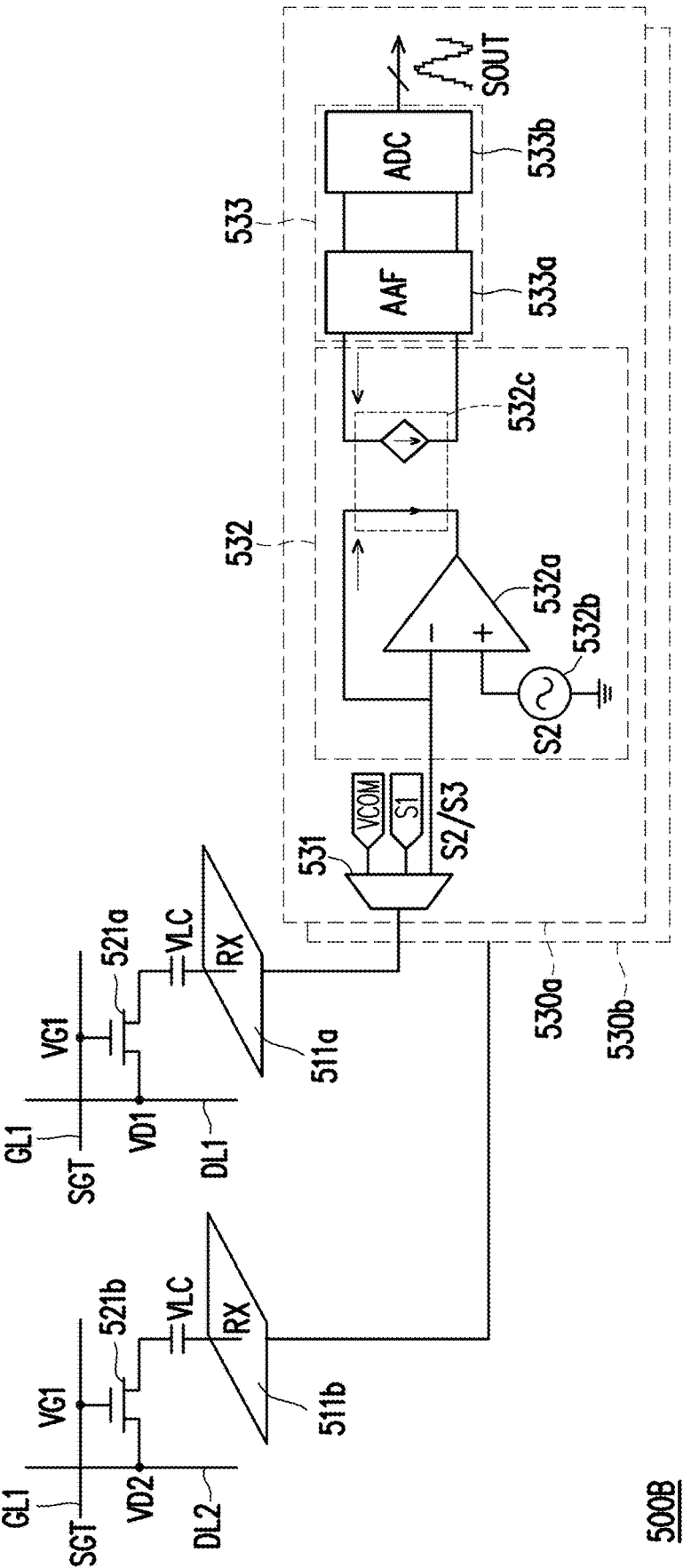

FIG. 5B is a circuit block diagram of a driving circuit according to an embodiment of the disclosure. Referring to FIG. 5B, compared with the embodiment of FIG. 5A, the driving circuit 500B includes multiple controlling circuits (e.g., the circuits 530a and 530b). These controlling circuits 530a and 530b have the same circuit architecture. Each of the controlling circuits 530a and 530b may be understood by analogy with the relevant descriptions of the driving circuit 500A in FIG. 5A. In addition, in the embodiment of FIG. 5B, the driving circuit 500B further includes a second touch-sensing electrode 512. The second touch-sensing electrode 512 is coupled to a second pixel switch 521b. The first touch-sensing electrode 511a and the coupled first pixel switch 521a are coupled to the controlling circuit 530a. The second touch-sensing electrode 511b and the coupled second pixel switch 521b are coupled to the controlling circuit 530b.

In the embodiment of FIG. 5B, the second pixel switch 521b is a transistor, and is implemented by, for example, an NMOSFET. A control terminal (i.e., a gate terminal) of the transistor 521b is coupled to one gate line GL1. A first terminal (i.e., a source/drain terminal) of the transistor 521b is coupled to the second touch-sensing electrode 511b through the liquid crystal layer. A second terminal (i.e., a source/drain terminal) of the transistor 521b is coupled to one data line DL2 in the pixel circuit.

In this embodiment, the driving circuit 500B executes a touch operation during the touch period to implement the touch function. During the touch period, assumed that two regions of the knob (e.g., the knob KB shown in FIG. 3) are touched by the finger, the first touch-sensing electrode 511a and the second touch-sensing electrode 511b corresponding to these regions are pulled to the reference ground voltage. During the touch period, the first pixel switch 521a and the second pixel switch 521b respectively coupled to these touch-sensing electrodes 511a and 511b are turned off.

Continued with the above description, the driving circuit 500B respectively provides multiple signals S1 to S2 to the first terminals of the first pixel switch 521a and the second pixel switch 521b through the coupled touch-sensing electrodes 511a and 511b. These pixels switches 521a and 521b, respectively in accordance with the touch-controlling signal SGT, maintain being turned off based on the corresponding signals S1 to S2, thereby prohibiting the driving of the corresponding pixel units to emit light.

In this embodiment, during the touch period, the controlling circuit 530a provides the offset voltage S1 to the first touch-sensing electrode 511a. Thereby, the first pixel switch 521a coupled to the first touch-sensing electrode 511a maintains being turned off according to the touch-controlling signal SGT and the offset voltage S1.

In addition, during the touch period, the controlling circuit 530b provides the touch driving signal S2 to the second touch-sensing electrode 511b. Thereby, the second pixel switch 521b coupled to the second touch-sensing electrode 511b maintains being turned off according to the touch-controlling signal SGT and the touch driving signal S2.

In detail, during the touch period, the first terminals of the controlling circuit 530b respectively receive the offset voltage S1 and the touch driving signal S2. The second terminal of the signal transmission circuit 531 in the controlling circuit 530a outputs the offset voltage S1 to the first touch-sensing electrode 511a. The second terminal of the signal transmission circuit in the controlling circuit 530b outputs the touch driving signal S2 to the second touch-sensing electrode 511b.

During the touch period, the control terminal (i.e., the gate terminal) of the first pixel switch (i.e., the transistor) 521a receives the touch-controlling signal SGT through the gate line GL1 and is turned off. The first terminal (i.e., the source/drain terminal) of the transistor 521a receives a liquid crystal electrode voltage VLC in the touch panel and the offset voltage S1 through the liquid crystal layer and the first touch-sensing electrode 511a. The second terminal (i.e., the source/drain terminal) of the transistor 521a receives a source controlling signal (e.g., the source controlling signal SS shown in FIG. 4) through the data line DL1.

Similarly, during the touch period, the control terminal (i.e., the gate terminal) of the second pixel switch (i.e., the transistor) 521b receives the touch-controlling signal SGT through the gate line GL1 and is turned off. The first terminal (i.e., the source/drain terminal) of the transistor 521b receives the liquid crystal electrode voltage VLC and the touch driving signal S2 through the liquid crystal layer and the second touch-sensing electrode 512. The second terminal (i.e., the source/drain terminal) of the transistor 521*b* receives the source controlling signal (e.g., the source controlling signal SS shown in FIG. 4) through the data line DL2.

Figure 6:
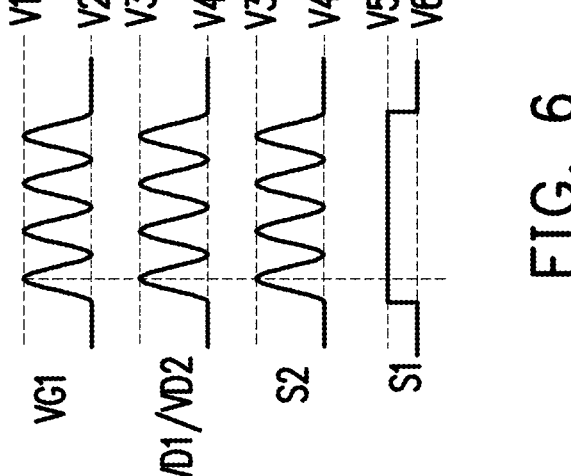
FIG. 6 is a schematic diagram of the operation of the driving circuit according to the embodiment of FIG. 5B of the disclosure.

Referring concurrently to FIG. 6, FIG. 6 is a schematic diagram of the operation of the driving circuit according to the embodiment of FIG. 5B of the disclosure. In FIG. 6, the horizontal axis represents the operation time of the driving circuits 500A and 500B during the touch period, and the vertical axis represents the voltage value.

In the embodiment of FIG. 6, the touch driving signal S2 is a sine wave signal that oscillates between voltage values V3 and V4, such that the voltage VD2 on the second terminal (i.e., the source/drain terminal) of the second pixel switch (i.e., the transistor) 521*b* is the aforementioned sine wave signal. In addition, the touch-controlling signal SGT is a sine wave signal that oscillates between the voltage values V1 and V2, such that the voltage VG1 on the control terminal (i.e., the gate terminal) of the transistor 521*b* is the aforementioned sine wave signal. These sine wave signals have the same frequency.

In this embodiment, the voltage values V1 and V2 are both less than 0, and the voltage value V1 (e.g., −3V) is greater than the voltage value V2 (e.g., −7.5V). The voltage values V3 and V4 are both greater than 0, and the voltage value V3 (e.g., 5V) is greater than the voltage value V4 (e.g., 0.5V). The threshold voltage value of the second pixel switch (i.e., the transistor) 521*b* is, for example, 1.5V.

In this way, the voltage difference between the control terminal (i.e., the gate terminal) and the first terminal (i.e., the source/drain terminal) of the second pixel switch (i.e., the transistor) 521*b* is, for example, represented by the following Formula (1). Vgs2 in Formula (1) is the aforementioned voltage difference, VG1 is the voltage on the control terminal (i.e., the gate terminal) of the transistor 521*b*, VS2 is the voltage on the first terminal (i.e., the source/drain terminal) of the transistor 521*b*, VLC is the liquid crystal electrode voltage VLC, and S2 is the touch driving signal S2.

$$Vgs2=VG1-VS2=VG1-(VLC+S2) \qquad \text{Formula (1)}$$

Based on FIG. 6 and Formula (1), the voltage difference between the control terminal (i.e., the gate terminal) and the first terminal (i.e., the source/drain terminal) of the second pixel switch (i.e., the transistor) 521*b* is, for example, the voltage value V1 (e.g., −3V) minus the sum of the liquid crystal electrode voltage VLC (e.g., −5.5V) and the voltage value V3 (e.g., 5V), that is, −2.5V.

It should be noted that since the voltage difference (e.g., −2.5V) between the control terminal (i.e., the gate terminal) and the first terminal of the second pixel switch (i.e., the transistor) 521*b* is less than the threshold voltage value of the transistor 521*b* (e.g., 1.5V), the transistor 521*b* maintains being turned off during the touch period.

In this embodiment, during the touch period, the controlling circuit 530*a* provides the offset voltage S1 to the first touch-sensing electrode 511*a*. In this way, the first pixel switch 511*a* that is coupled to the first touch-sensing electrode 511*a* maintains being turned off according to the touch-controlling signal SGT and the offset voltage S1.

Specifically, during the touch period, the controlling circuit 530*a* provides the offset voltage S1 according to the characteristics of the pixel switches 521*a* and 521*b*. The aforementioned characteristics include parameters such as gate width and gate length of the first pixel switch (i.e., the transistor) 521*a*. That is, the offset voltage S1 may be flexibly adjusted based on the characteristics of the pixel switches (i.e., the transistors) 521*a* and 521*b*.

During the touch period, the first terminal of the signal transmission circuit 531 receives the offset voltage S1. The second terminal of the signal transmission circuit 531 outputs the offset voltage S1 to the first touch-sensing electrode 511*a*.

Referring again to FIG. 6, the voltage VG1 on the control terminal (i.e., the gate terminal) of the first pixel switch (i.e., the transistor) 521*a* is the same sine wave signal as the touch-controlling signal SGT. The voltage VD1 on the second terminal (i.e., the source/drain terminal) of the transistor 521*a* is the same as the sine wave signal of the touch driving signal S2.

In addition, the offset voltage S1 is a direct current (DC) voltage. The offset voltage S1 has a voltage value V5 greater than 0. In this embodiment, the voltage value V5 (e.g., 2 volts) is greater than the voltage value V6 (e.g., 0 volts). The threshold voltage value of the first pixel switch (i.e., the transistor) 521 is, for example, 1.5V.

In this way, the voltage difference between the control terminal (i.e., the gate terminal) and the first terminal (i.e., the source/drain terminal) of the first pixel switch (i.e., the transistor) 521*a* is, for example, represented by the following Formula (2). Vgs1 in Formula (2) is the aforementioned voltage difference, VG1 is the voltage on the control terminal (i.e., the gate terminal) of the transistor 521*a*, VS1 is the voltage on the first terminal (i.e., the source/drain terminal) of the transistor 521*a*, VLC is the liquid crystal electrode voltage VLC, and S1 is the offset voltage S1

$$Vgs1=VG1-VS1=VG1-(VLC+S1) \qquad \text{Formula (2)}$$

Based on FIG. 6 and Formula (2), the voltage difference between the control terminal (i.e., the gate terminal) and the first terminal (i.e., the source/drain terminal) of the first pixel switch (i.e., the transistor) 521*a* is, for example, the voltage value V1 (e.g., −3V) minus the sum of the liquid crystal electrode voltage VLC (e.g., −5.5V) and the voltage value V5 (e.g., 2V), that is, 0.5V.

It should be noted that the first terminal (i.e., the source/drain terminal) of the first pixel switch (i.e., the transistor) 521*a* is not grounded. Since the voltage difference (e.g., 0.5V) between the control terminal (i.e., the gate terminal) and the first terminal (i.e., the source/drain terminal) of the transistor 521*a* is less than the threshold voltage value of the transistor 521*a* (e.g., 1.5V), the transistor 521*a* maintains being turned off during the touch period.

That is, during the touch period, the voltage on the first terminal (i.e., the source/drain terminal) of the first pixel switch (i.e., the transistor) 521*a* is controlled through the offset voltage S1, such that the voltage difference between the gate terminal and the source terminal of the transistor 521*a* maintains being below the threshold voltage value. In this way, the driving circuit 500A is capable of ensuring that the transistor 521*a* does not leak current during the touch period, thereby preventing the pixel unit corresponding to the transistor 521*a* from being driven, thus preventing visual anomalies.

In the embodiment of FIG. 5B, as described in the embodiment of FIG. 4 regarding the touch period, when the knob is touched and twisted, multiple touch-sensing electrodes 511*a* and 511*b* and the corresponding conductive electrodes in the knob form a conductive loop. At this time, the first touch-sensing electrode 511*a* generates the touch result signal S3 according to the sensing capacitors in the conductive loop.

Continuing from the above description, the first touch-sensing electrode 511*a* outputs the touch result signal S3 to the signal transmission circuit 531. The signal transmission circuit 531 transmits the touch result signal S3 to the inverting input terminal of the operational amplifier 532*a*. The operational amplifier 532*a* and the dependent current source 532*c* output an amplified touch result signal S3 to the anti-aliasing filter 533*a* according to the touch result signal S3.

Next, the anti-aliasing filter 533*a* executes a filtering operation on the aforementioned touch result signal S3, and outputs the filtered touch result signal S3 to the analog-to-digital converter 533*b*. The analog-to-digital converter 533*b* converts the aforementioned touch result signal S3 into a touch output signal SOUT that may be processed by the processing circuit. In this way, the processing circuit obtains the position of the knob currently touched by the user according to the touch output signal SOUT, to further obtain the rotational direction of the knob.

Figure 7:
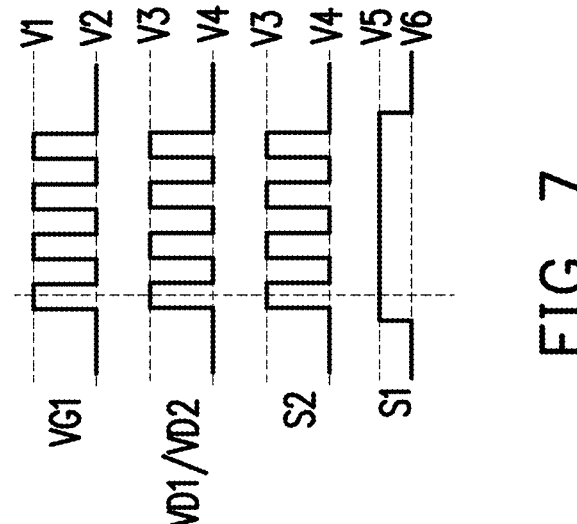
FIG. 7 is a schematic diagram of the operation of the driving circuit according to the embodiment of FIG. 5B of the disclosure.

FIG. 7 is a schematic diagram of the operation of the driving circuit according to the embodiment of FIG. 5B of the disclosure. Referring to FIG. 5B and FIG. 7, in FIG. 7, the horizontal axis represents the operation time of the driving circuit 500 during the touch period, and the vertical axis represents the voltage value.

Compared with the embodiment of FIG. 6, in the embodiment of FIG. 7, the touch driving signal S2 is a pulse signal (i.e., a square wave signal) that switches between voltage values V3 and V4, such that the respective voltages VD1 and VD2 on the second terminals (i.e., the source/drain terminals) of multiple pixel switches (i.e., the transistors) 521*a* and 521*b* are the aforementioned square wave signal. In addition, the touch-controlling signal SGT is a square wave signal that switches between voltage values V1 and V2, such that the respective voltages VG1 on the control terminals (i.e., gate terminals) of the transistors 521*a* and 521*b* are the aforementioned square wave signal. These square wave signals have the same frequency.

In another embodiment, the touch driving signal S2 is a triangle wave signal that switches between voltage values V3 and V4, such that the respective voltages VD1 and VD2 on the second terminals (i.e., the source/drain terminals) of multiple pixel switches (i.e., the transistors) 521*a* and 521*b* are the aforementioned triangle wave signal. In addition, the touch-controlling signal SGT is a triangle wave signal that switches between voltage values V1 and V2, such that the respective voltages VG1 on the control terminals (i.e., gate terminals) of the transistors 521*a* and 521*b* are the aforementioned triangle wave signal. In another embodiment, the touch driving signal S2 may be a time-varying signal of any waveform.

Figure 8:
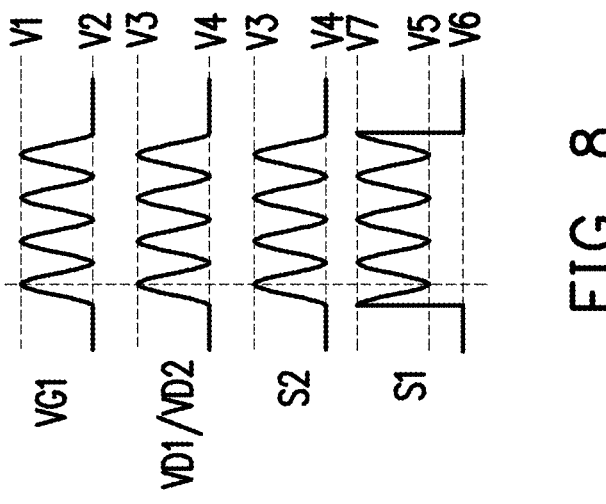
FIG. 8 is a schematic diagram of the operation of the driving circuit according to the embodiment of FIG. 5B of the disclosure.

FIG. 8 is a schematic diagram of the operation of the driving circuit according to the embodiment of FIG. 5B of the disclosure. Referring to FIG. 5B and FIG. 8, in FIG. 8, the horizontal axis represents the operation time of the driving circuit 500B during the touch period, and the vertical axis represents the voltage value.

Compared with the embodiment of FIG. 6, in the embodiment of FIG. 8, the offset voltage S1 is a combination of the DC voltage and the inverse phase of the touch driving signal S2. In this way, the peaks and valleys of the offset voltage S1 oscillate between the voltage values V7 and V5, in which the voltage value V7 is the voltage value V3 plus the voltage difference between the voltage values V5 and V6.

In another embodiment, when the touch driving signal S2 is a square wave signal or a triangle wave signal, the offset voltage S1 is a combination of the DC voltage and the inverse phase of the touch driving signal S2. The offset voltage S1 may be a combination of the DC voltage and the inverse phase of the touch driving signal S2 of any waveform.

It should be noted that since the offset voltage S1 is a combination of the DC voltage and the inverse phase of the touch driving signal S2, during the same touch period, the first touch-sensing electrode 511*a* is capable of increasing the sensed voltage difference. In this way, based on the offset voltage S1, the driving circuit 500B may increase the sensing amount of the touch operation, thereby improving the signal-to-noise ratio (SNR).

To sum up, during the touch period, the driving circuit and the operating method thereof and the controlling circuit of the embodiment of the disclosure provide a non-0 volt offset voltage to the touch-sensing electrode through the controlling circuit, such that the pixel switch that is coupled to such touch-sensing electrode is capable of maintaining being turned off during the touch period to prevent electricity leakage. In this way, the driving circuit is capable of preventing visual anomalies in the applied knob apparatus during the touch period. In some embodiments, by setting the offset voltage to be a combination of a DC voltage and the inverse phase of the touch driving signal, the driving circuit is capable of increasing the sensing amount of the touch operation.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A driving circuit, for a knob apparatus, wherein the knob apparatus comprises a knob and a touch panel, the knob is disposed on the touch panel, wherein the driving circuit comprises:

a plurality of touch-sensing electrodes, disposed in the touch panel and coupled to a plurality of pixel switches of the touch panel; and a controlling circuit, disposed in the touch panel, coupled to the plurality of touch-sensing electrodes, and configured to provide an offset voltage to a first touch-sensing electrode of the plurality of touch-sensing electrodes during a touch period, and a first pixel switch coupled to the first touch-sensing electrode maintains being turned off according to a touch-controlling signal and the offset voltage.

2. The driving circuit according to claim 1, wherein the controlling circuit provides the offset voltage according to characteristics of the plurality of pixel switches.

3. The driving circuit according to claim 1, wherein the first pixel switch is a transistor, wherein a control terminal of the transistor receives the touch-controlling signal, and a first terminal of the transistor receives the offset voltage and a liquid crystal electrode voltage in the touch panel during the touch period, such that a voltage difference between the control terminal and the first terminal of the transistor is less than a threshold voltage value of the transistor.

4. The driving circuit according to claim 1, wherein the offset voltage is a direct current voltage and has a voltage value greater than 0 volts.

5. The driving circuit according to claim 1, wherein the controlling circuit is further configured to provide a touch driving signal to a second touch-sensing electrode of the plurality of touch-sensing electrodes during the touch period, such that a second pixel switch coupled to the second touch-sensing electrode maintains being turned off according to the touch-controlling signal and the touch driving signal.

6. The driving circuit according to claim 5, wherein the second pixel switch is a transistor, wherein a control terminal of the transistor receives the touch-controlling signal, and a first terminal of the transistor receives the touch driving signal and a liquid crystal electrode voltage in the touch panel during the touch period, such that a voltage difference between the control terminal and the first terminal of the transistor is less than a threshold voltage value of the transistor.

7. The driving circuit according to claim 5, wherein the offset voltage is a combination of a direct current voltage and an inverse phase of the touch driving signal.

8. The driving circuit according to claim 5, wherein the touch driving signal is one of a sine wave signal, a square wave signal, and a triangle wave signal.

9. An operating method of a driving circuit, for a knob apparatus, wherein the knob apparatus comprises a knob and a touch panel, the knob is disposed on the touch panel, wherein the operating method comprises:

providing, by a controlling circuit, an offset voltage to a first touch-sensing electrode of a plurality of touch-sensing electrodes during a touch period, wherein the plurality of touch-sensing electrodes and the controlling circuit are disposed in the touch panel, and the plurality of touch-sensing electrodes are coupled to a plurality of the pixel switches of the touch panel, and maintaining, by the controlling circuit, a first pixel switch coupled to the first touch-sensing electrode being turned off according to a touch-controlling signal and the offset voltage during the touch period.

10. The operating method according to claim 9, further comprising:

providing, by the controlling circuit, the offset voltage according to characteristics of the pixel switches.

11. The operating method according to claim 9, wherein the first pixel switch is a transistor, the operating method further comprises:

receiving, by a control terminal of the transistor, the touch-controlling signal during the touch period; and receiving, by a first terminal of the transistor, the offset voltage and a liquid crystal electrode voltage in the touch panel during the touch period, such that a voltage difference between the control terminal and the first terminal of the transistor is less than a threshold voltage value of the transistor.

12. The operating method according to claim 9, wherein the offset voltage is a direct current voltage and has a voltage value greater than 0 volts.

13. The operating method according to claim 9, further comprising:

providing, by the controlling circuit, a touch driving signal to a second touch-sensing electrode of the plurality of touch-sensing electrodes during the touch period; and maintaining, by the controlling circuit, a second pixel switch coupled to the second touch-sensing electrode being turned off according to the touch-controlling signal and the touch driving signal during the touch period.

14. The operating method according to claim 13, wherein the second pixel switch is a transistor, the operating method further comprises:

receiving, by a control terminal of the transistor, the touch-controlling signal during the touch period; and receiving, by a first terminal of the transistor, the touch driving signal and a liquid crystal electrode voltage in the touch panel during the touch period, such that a voltage difference between the control terminal and the first terminal of the transistor is less than a threshold voltage value of the transistor.

15. The operating method according to claim 13, wherein the offset voltage is a combination of a direct current voltage and an inverse phase of the touch driving signal.

16. The operating method according to claim 13, wherein the touch driving signal is one of a sine wave signal, a square wave signal, and a triangle wave signal.

17. A controlling circuit, to control a voltage level of a touch-sensing electrode disposed in a touch panel at different moments, wherein the touch-sensing electrode corresponds to a conductive electrode which is disposed in a bottom of a knob, when the knob is disposed in the touch panel, a user operates the touch panel through the knob, wherein the controlling circuit comprises:

a signal transmission circuit, having a plurality of first terminals for receiving an offset voltage, a touch driving signal and a reference voltage, wherein a second terminal of the signal transmission circuit is coupled to the touch-sensing electrode to provide one of the offset voltage, the touch driving signal and the reference voltage to the touch-sensing electrode during a touch period, or to receive a touch result signal, wherein during the touch period, a pixel switch which is coupled to the touch-sensing electrode and is disposed in the touch panel maintains turned off according to a touch-controlling signal and the offset voltage;

an amplification circuit, coupled to one of the plurality of first terminals of the signal transmission circuit to receive the touch result signal; and a signal processing circuit, coupled to the amplification circuit, to generate a touch output signal according to the touch result signal.

* * * * *